US012797999B2

(12) United States Patent
Batarseh

(10) Patent No.: US 12,797,999 B2
(45) Date of Patent: Nov. 17, 2026

(54) MULTIPLE CONVERGING LASER BEAM APPARATUS AND METHOD

(71) Applicant: Saudi Arabian Oil Company, Dhahran (SA)

(72) Inventor: Sameeh Issa Batarseh, Dhahran Hills (SA)

(73) Assignee: Saudi Arabian Oil Company, Dhahran (SA)

( * ) Notice: Subject to any disclaimer, the term of this patent is extended or adjusted under 35 U.S.C. 154(b) by 789 days.

(21) Appl. No.: 17/561,100

(22) Filed: Dec. 23, 2021

(65) Prior Publication Data

US 2023/0201959 A1 Jun. 29, 2023

(51) Int. Cl.

| | |
|---|---|
| ***B23K 26/06*** | (2014.01) |
| ***B23K 26/064*** | (2014.01) |
| ***B23K 26/067*** | (2006.01) |
| ***B23K 26/14*** | (2014.01) |
| ***B23K 26/142*** | (2014.01) |

(Continued)

(52) U.S. Cl.

CPC ...... *B23K 26/0604* (2013.01); *B23K 26/0648* (2013.01); *B23K 26/0676* (2013.01); *B23K 26/14* (2013.01); *B23K 26/142* (2015.10); *B23K 26/146* (2015.10); *B23K 26/1476* (2013.01); *B23K 26/38* (2013.01); *B23K 26/382* (2015.10);

(Continued)

(58) Field of Classification Search

CPC ............ B23K 26/0604; B23K 26/0648; B23K 26/0676; B23K 26/14; B23K 26/142; B23K 26/1476; B23K 26/146; B23K 26/38; B23K 26/382; B23K 26/40; E21B 7/14; E21B 7/15; E21B 7/00

See application file for complete search history.

(56) References Cited

U.S. PATENT DOCUMENTS 4,090,572 A * 5/1978 Welch ........................ E21B 7/15 219/121.84
6,452,132 B1 * 9/2002 Fuse .................... B23K 26/066 359/569

(Continued)

FOREIGN PATENT DOCUMENTS

CN 203081295 U 7/2013
CN 107186346 A 9/2017

(Continued)

OTHER PUBLICATIONS

Machine English Translation of WO-2021005068-A1 (Year: 2021).*

(Continued)

*Primary Examiner* — Erwin J Wunderlich
(74) *Attorney, Agent, or Firm* — Bracewell LLP; Constance G. Rhebergen; Brian H. Tompkins

(57) ABSTRACT

A laser head apparatus that enables the use of smaller parallel converging laser beams that create multiple smaller holes in a material followed by a larger parallel diverging laser beams that remove additional material. The laser head apparatus includes laser optics and purging nozzles. A process for removing material using the laser head apparatus includes moving the laser head apparatus to a position to generate parallel converging laser beams at a target location in the material and moving the laser head apparatus to a position to generate parallel diverging laser beams at the target location from the converging laser beams.

9 Claims, 6 Drawing Sheets

(51) Int. Cl.

| | |
|---|---|
| ***B23K 26/146*** | (2014.01) |
| ***B23K 26/38*** | (2014.01) |
| ***B23K 26/382*** | (2014.01) |
| ***B23K 26/40*** | (2014.01) |
| ***E21B 7/00*** | (2006.01) |
| ***E21B 7/14*** | (2006.01) |
| ***E21B 7/15*** | (2006.01) |

(52) U.S. Cl.

CPC ................ *B23K 26/40* (2013.01); *E21B 7/00* (2013.01); *E21B 7/14* (2013.01); *E21B 7/15* (2013.01)

(56) References Cited

U.S. PATENT DOCUMENTS

| | | | | |
|---|---|---|---|---|
| 6,755,262 | B2 * | 6/2004 | Parker | B23K 26/40 175/57 |
| 6,888,097 | B2 | 5/2005 | Batarseh | |
| 7,416,258 | B2 | 8/2008 | Reed et al. | |
| 8,395,083 | B2 | 3/2013 | Naveh et al. | |
| 9,006,608 | B2 | 4/2015 | Gubler et al. | |
| 9,062,499 | B2 | 6/2015 | Braga et al. | |
| 11,028,647 | B2 * | 6/2021 | Batarseh | E21B 43/26 |
| 2005/0206041 | A1 * | 9/2005 | Temple | B23K 26/067 264/400 |
| 2010/0044105 | A1 * | 2/2010 | Faircloth | E21B 10/60 175/16 |
| 2012/0074110 | A1 * | 3/2012 | Zediker | E21B 10/60 219/121.72 |
| 2012/0195334 | A1 * | 8/2012 | Wilkiel | E21B 7/14 372/26 |
| 2014/0158425 | A1 * | 6/2014 | Bozso | E21B 7/15 175/16 |
| 2014/0231147 | A1 * | 8/2014 | Bozso | E21B 7/061 175/73 |
| 2014/0346157 | A1 * | 11/2014 | Bozso | E21B 29/02 219/121.85 |
| 2016/0221125 | A1 * | 8/2016 | Faircloth | B23K 26/0732 |
| 2017/0191314 | A1 * | 7/2017 | Faircloth | E21B 37/00 |
| 2020/0115962 | A1 * | 4/2020 | Batarseh | E21B 7/15 |
| 2023/0201971 | A1 * | 6/2023 | Batarseh | B23K 26/0648 219/121.71 |

FOREIGN PATENT DOCUMENTS

| | | | | |
|---|---|---|---|---|
| JP | 3641984 | B2 | 4/2005 | |
| JP | 3738790 | B2 | 1/2006 | |
| JP | 3797068 | B2 | 7/2006 | |
| WO | 2019117867 | A1 | 6/2019 | |
| WO | 2019117868 | A1 | 6/2019 | |
| WO | 2019117871 | A1 | 6/2019 | |
| WO | WO-2019117869 | A1 * | 6/2019 | E21B 10/54 |
| WO | WO-2021005068 | A1 * | 1/2021 | G01N 21/1702 |

OTHER PUBLICATIONS

"Chapter: 5. Rock Excavation Tools" Drilling and Excavation Technologies for the Future (1994), The National Academies Press Open Book, available as of Apr. 21, 2021 at: https://www.nap.edu/read/2349/chapter/6; pp. 1-25.

Zibner, F. et al.; "High-precision laser microcutting and laser microdrilling using diffractive bean-splitting and high-precision flexible beam alignment" (abstract only) Proceedings of the SPIE, vol. 10377, Aug. 2017; p. 1.

* cited by examiner

MULTIPLE CONVERGING LASER BEAM APPARATUS AND METHOD

BACKGROUND

Field of the Disclosure

The present disclosure generally relates to drilling and the removal of materials, such as in well drilling and completion. More specifically, embodiments of the disclosure relate to the use of lasers to drill and remove materials.

Description of the Related Art

In a first step of the drilling stage in conventional well construction, a mechanical drill bit is used to drill into the formation at an interval of approximately 30 feet. In a second step, the 30 foot section is cased with sections of steel pipe. The steel pipes of the casing can be cemented into place. The steps of drilling and casing can be repeated in 30 foot intervals until the desired well length is reached. After casing installation, completion of the well may include perforating the casing using, for example, a shaped charged gun.

The drilling and completion stages in conventional well construction are time consuming and costly. Alternate approaches that allow for greater flexibility are desired. Production, producing fluid from the formation to the surface, can only begin after the drilling and completion stages are finished. Various challenges may occur during these operations; for example, pipes or other tubular structures used during drilling or production may be blocked or plugged due to the build-up of materials inside.

SUMMARY

High powered laser energy may be used for well stimulation and drilling, as well for other applications such as perforation, removal of scale and other materials, formation heating, etc. These applications typically rely on the transfer of heat to materials to weaken the materials (for example, a rock formation) and enable easier removal. The heat from a laser may melt, spall, or vaporize materials such as rocks. However, existing lasers may be unable to remove all of a material, and the effectiveness may be limited by the properties of some materials.

The interaction between a laser and a material may depend on several factors, including the color and reflectivity of the material. For example, brighter colors may reflect more laser energy. FIG. 1 depicts the results of an experiment conducted to evaluate the interaction between a laser and rocks based on color. The laser used in the experiment was a relatively high power fiber laser with a 1064 nanometer (nm) wavelength. FIG. 1 shows a bar graph 100 depicting the reflectivity (on the y-axis) of various rock samples such as Berea (bar 102), shale 7 (bar 104), shale 16 (bar 106), and shale 5 (bar 108). As shown in the graph 100, the lighter colored Berea sandstone sample had a greater reflectivity of about 85%, while the darker colored shale samples had a lower reflectivity. For example, the darkest sample of shale 5 had a reflectivity of about 9.7%. The samples having a greater reflectivity exhibit greater energy loss and, consequently, less removal of the material for a given laser. Removal of such materials using prior art tools and techniques may be difficult and may increase the challenge of operations relying on lasers for material removal (for example, for drilling, scale removal, and so on).

Embodiments of the disclosure include a laser tool having a laser head apparatus that combines mechanical and optical components to form smaller converging laser beams that create multiple smaller holes followed by larger diverging laser beams that remove additional material. Advantageously, the laser tool and associated processes may provide for improved removal of brighter colored and highly reflective materials that are challenging to remove via laser due to the reflective energy loss. The penetration and subsequent removal of a reflective material may require a greater power of laser beam. However, smaller laser beams of similar power may have an increased intensity based on the relationship between intensity, power, and beam size, shown in Equation 1:

$$\text{Intensity}=\text{Power}/\text{Beam Size} \quad (1)$$

Thus, for a given laser power, smaller beams may have a greater energy density and result in an increased efficiency of removal of some materials via the creation of smaller holes. FIG. 2A is a photograph 200 of a hole created in a material using a single larger laser beam in accordance with an embodiment of the disclosure. FIG. 2B is a photograph 202 of smaller holes created in the same material using multiple smaller laser beams generated from the single laser beam used to create the hole depicted in FIG. 2A.

In one embodiment, a laser head apparatus is provided. The lased head apparatus includes a cylindrical housing and laser optics disposed in the cylindrical housing and configured to transform a laser beam into a plurality of parallel converging laser beams, such that each of the plurality of parallel converging laser beams converge onto a focal plane and the diameter of each of each of the plurality of parallel converging laser beams is less than the diameter of the laser beam. The apparatus also includes and a plurality of purging fluid nozzles disposed in the cylindrical housing.

In some embodiments, the laser optics include a single lens having a plurality of optical elements, such that each of the optical elements are configured to transform a portion of the laser into a respective one of the plurality of parallel converging laser beams. In some embodiments, the plurality of purging fluid nozzles are disposed in the single lens. In some embodiments, the laser optics include a plurality of lenses, such that each of the plurality of lenses are configured to transform a portion of the laser into a respective one of the plurality of parallel converging laser beams. In some embodiments, the plurality of purging fluid nozzles are arranged to provide a purging fluid stream, such that the purging fluid includes nitrogen.

In another embodiment, a method is provided that includes introducing a plurality of parallel converging laser beams to the material at a target location, such that the plurality of parallel converging laser beams are produced by laser optics disposed in a cylindrical housing of a laser head apparatus and are configured to transform a laser beam into the plurality of parallel converging laser beams. Each of the plurality of parallel converging laser beams are converging onto a focal plane such that the target location is located between the focal plane and the laser head apparatus. The method also includes removing a first portion of the material using the plurality of parallel converging laser beams. The method further includes introducing a plurality of parallel diverging laser beams to the material at the target location. The plurality of parallel diverging laser beams are formed from the plurality of parallel converging laser beams, such that the target location is located beyond the focal plane and the plurality of parallel diverging laser beams overlap before introduction to the target location. Finally, the method includes removing a second portion of the material using the plurality of parallel diverging laser beams.

In some embodiments, the method includes introducing a purging fluid via a plurality of purging nozzles disposed in the laser head apparatus while introducing the plurality of parallel converging laser beams. In some embodiments, the method includes introducing a purging fluid via a plurality of purging nozzles disposed in the laser head apparatus while introducing the plurality of parallel diverging laser beams. In some embodiments, introducing a plurality of parallel diverging laser beams to the material at the first target location includes increasing a power of the laser beam. In some embodiments, removing the second portion of the material includes moving the laser head apparatus toward the material during the removal. In some embodiments, the plurality of parallel converging laser beams is a first plurality of parallel converging laser beams, the target location is a first target location, and the focal plane is a first focal plane, such that the method further includes introducing a second plurality of parallel converging laser beams to the material at a second target location, such that the second plurality of parallel are converging laser beams are produced by the laser head apparatus disposed in the cylindrical housing and each of the second plurality of parallel converging laser beams converge onto a second focal plane such that the second target location is located between the second focal plane and the laser head. In such embodiments, the method also includes removing a third portion of the material using the second plurality of parallel converging laser beams. In such embodiments, the plurality of parallel diverging laser beams is a first plurality of parallel diverging laser beams, such that the method includes introducing a second plurality of parallel diverging laser beams to the material at the second target location, such that the second plurality of parallel diverging laser beams are formed from the first plurality of parallel converging laser beams, the second target location is located beyond the second focal plane, and the second plurality of parallel diverging laser beams overlap before introduction to the second target location. In such embodiments, the method includes removing a fourth portion of the material using the second plurality of parallel diverging laser beams. In some embodiments, the laser optics include a single lens having a plurality of optical elements, such that each of the optical elements configured to transform a portion of the laser into a respective one of the plurality of parallel converging laser beams. In some embodiments, the laser optics include a plurality of lenses, such that each of the plurality of lenses configured to transform a portion of the laser into a respective one of the plurality of parallel converging laser beams.

In another embodiment, a system is provided that includes a laser unit configured to generate a laser beam and a fiber optic cable, optically connected to laser optics of a laser head apparatus. The fiber optic cable is configured to transmit the laser beam to the laser optics to produce a plurality of parallel converging laser beams. The system further includes a purging fluid line, the purging fluid line connected to a purging fluid source and configured to supply a purging fluid to a plurality of purging fluid nozzles of the laser head apparatus. The system also includes the laser head apparatus having a cylindrical housing and the laser optics disposed in the cylindrical housing and configured to transform the laser beam into the plurality of parallel converging laser beams, such that each of the plurality of parallel converging laser beams converging onto a focal plane. The laser head apparatus also includes the plurality of purging fluid nozzles disposed in the cylindrical housing, such that the plurality of purging fluid nozzles are configured to distribute a purging fluid.

In some embodiments, the laser optics include a single lens having a plurality of optical elements, such that of the optical elements configured to transform a portion of the laser into a respective one of the plurality of parallel converging laser beams. In some embodiments, the plurality of purging fluid nozzles are disposed in the single lens. In some embodiments, the laser optics include a plurality of lenses, such that each of the plurality of lenses configured to transform a portion of the laser into a respective one of the plurality of parallel converging laser beams. In some embodiments, the purging fluid include nitrogen.

In another embodiment, a method is provided that includes repeating the following operations until the material is removed: A) positioning a laser head apparatus such that a distance between the laser head apparatus and a target location is less than the distance between the laser head apparatus and a focal plane of a lens of the laser head; B) generating a plurality of parallel converging laser beams via the laser head apparatus to contact the material; C) positioning the laser head apparatus such that a distance between the laser head apparatus and the target location is greater than the distance between the laser head apparatus and the focal plane of the lens of the laser head apparatus; and D) generating a plurality of parallel diverging laser beams to contact the material via the laser head apparatus, such that the parallel diverging laser beams overlap before contacting the material.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Figure 1:
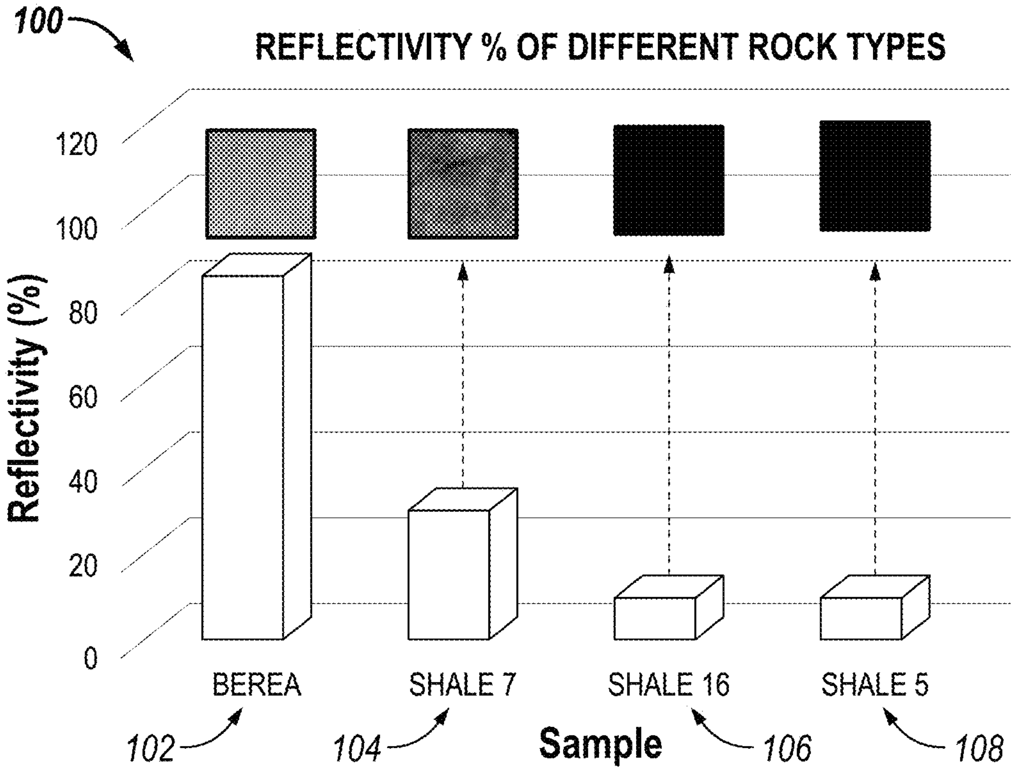
FIG. 1 is bar graph of the results of an experiment conducted to evaluate the interaction between a laser and rocks based on color in accordance with an embodiment of the disclosure.
Figure 2A:
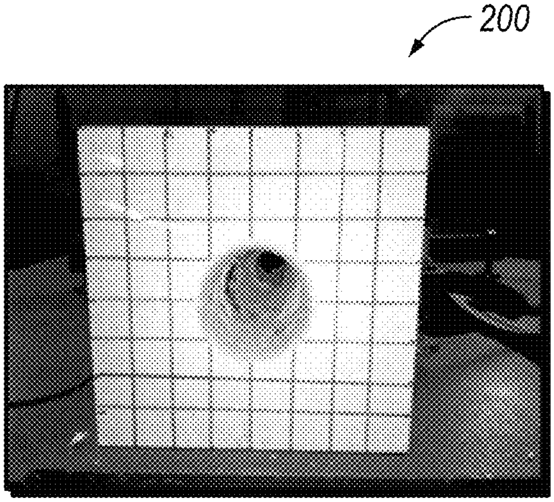
FIGS. 2A and 2B are photographs of holes created in a material using laser beams in accordance with an embodiment of the disclosure.
Figure 2B:
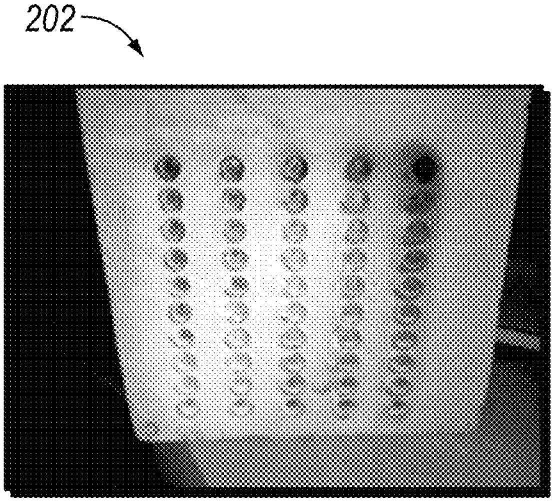
Figure 3:
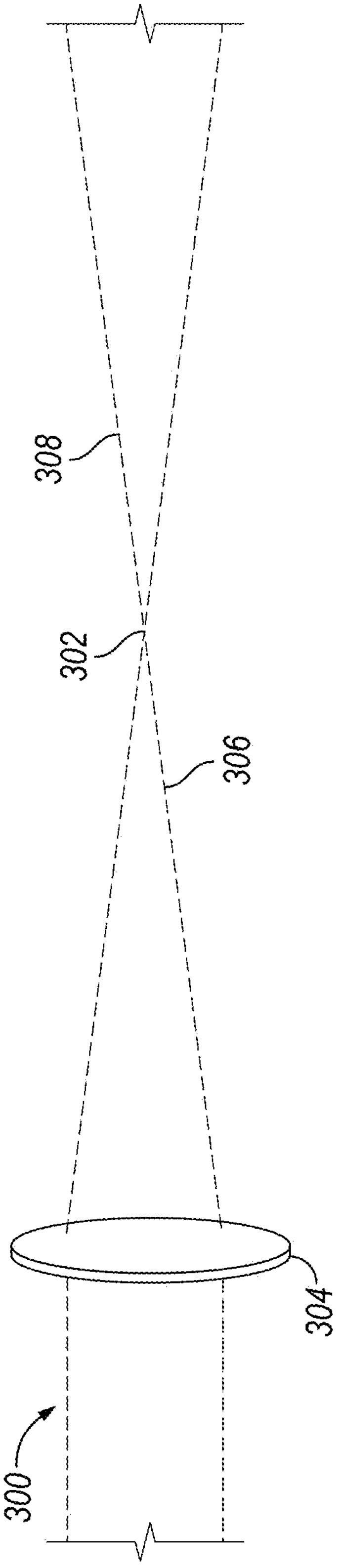
FIG. 3 is a schematic diagram of the operation of a laser beam and generation of a focal point in accordance with an embodiment of the disclosure.

Embodiments of the disclosure are directed to the use of multiple converging laser beams and multiple diverging laser beams to remove a material via a laser. Laser optics, such as a lens, may be used to produce a laser beam that converges to a focal point and diverges beyond the focal point. For example, FIG. 3 depicts the operation of a laser beam 300 and generation of a focal point 302 in accordance with an embodiment of the disclosure. As shown in FIG. 3, the laser beam 300 may enter a focus lens 304 designed to have the focal point 302. The portion 306 of laser beam 300 before the focal point 302 may be referred as "before focus" or "bf," while the portion 308 of the laser beam 300 after the focal point 302 may be referred to as "after focus" or "af." After the focus lens 304, the laser beam 300 converges such that the intensity of the before focus portion 306 of the laser beam increases with distance until the focal point 302. After the focal point 302, the laser beam 300 diverges, such that the intensity of the after focus portion 308 of the laser beam 300 decreases with distance.

Embodiments of the disclosure include a laser head apparatus that enables the use of smaller parallel converging laser beams that create multiple smaller holes in a material followed by larger parallel diverging laser beams (of lesser intensity than the smaller parallel converging laser beams) that remove additional material. Embodiments include a moveable laser head apparatus having laser optics and purging nozzles and that may be coupled to a tool body. A laser beam entering the laser head apparatus may be divided into parallel converging laser beams each having a greater intensity than the laser beam before dividing. The parallel converging laser beams may create multiple smaller holes at a target location of a material to remove a portion of the material. After creation of the smaller holes, the laser head apparatus may be moved in a direction away from the target location to provide for the creation of parallel diverging laser beams having lesser intensity. The parallel diverging laser beams may overlap before impacting the target location and may be used to remove additional portions material.

Embodiments of the disclosure also include a process for removing material using the laser head apparatus. The process may include moving a laser head apparatus to a position to generate parallel converging laser beams at a target location in the material so that the target location is located between the focal plane of the parallel converging laser beams and the laser head apparatus. Portions of the material may be removed using the parallel converging laser beams. The process may further include moving the laser head apparatus to a position to generate parallel diverging laser beams at the target location from the converging laser beams, so that the target location is located beyond the focal plane of the converging laser beams and the diverging laser beams overlap before contacting the material. Additional portions of the material may be removed using the diverging laser beams. The process may continue until a desired amount of the material is removed.

Figure 4B:
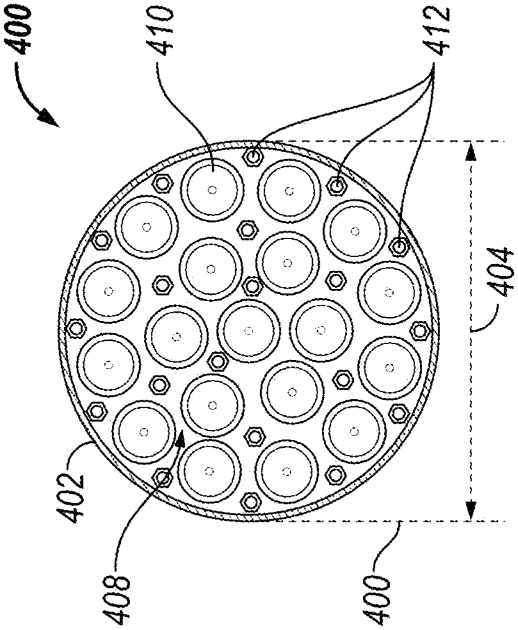
FIGS. 4A and 4B are schematic views of a laser head apparatus for removing materials using a laser beam in accordance with an embodiment of the disclosure.
Figure 4A:
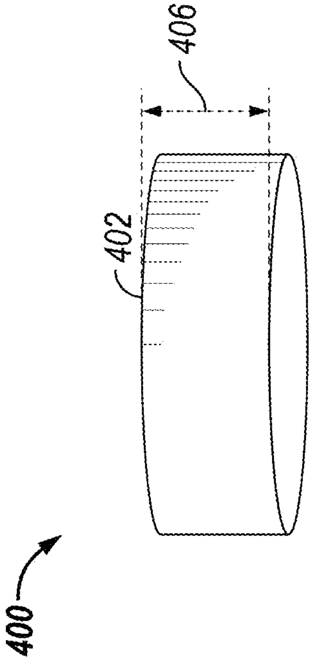

FIG. 4A is a first view and FIG. 4B is second view perpendicular to the first view of a laser head apparatus 400 for removing materials using a laser beam in accordance with an embodiment of the disclosure. As shown in these figures, the laser head apparatus 400 may have a generally cylindrical housing 402 having a diameter 404 and a length

406. As shown in FIG. 4B, the interior of the housing 402 may include laser optics 408 (for example, a single lens) and purging nozzles 412 disposed within the housing 402.

The laser optics may include one or more lenses for shaping or otherwise manipulating a laser beam received by the laser head apparatus 400. By way of example, FIG. 4B depicts laser optics 408 having a single lens with multiple optical elements 410. Each optical element 410 may be a focusing element that produces a converging laser beam from a laser beam received by the laser head apparatus. In other embodiments, the laser optics 408 may include multiple smaller lenses (for example, a lens for each converging laser beam produced by the laser head apparatus 400). The lens and optical elements 410 (or lenses in other embodiments) may be formed of any material suitable for use in lenses that shape or otherwise manipulate a laser beam. Examples of materials suitable for use in the one or more lenses of laser optics of the laser head apparatus may include glass, plastic, quartz, and crystal. In some embodiments, the laser optics 408 may include additional components, such as a collimator, to produce a collimated laser beam. As will be appreciated, a collimator may be combined with the one or more lenses described in the disclosure. The collimator may be formed of any material suitable for collimating a laser beam. By way of example, such materials may include glass, plastic, quartz, and crystal.

The purging nozzles 412 may direct a purging fluid through the laser head apparatus 412 to a target location. As described in the disclosure, purging fluid may be supplied to the purging nozzle via a line coupled to a purging fluid source. The flow of purging fluid may be controlled by a valve or other control device as known in the art. The purging fluid may include nitrogen. In some embodiments, the purging fluid may be nitrogen gas, liquid nitrogen, helium, air, carbon dioxide, or water. In some embodiments, the purging nozzles 412 may be disposed in a single lens of the fiber optics 408. In other embodiments, the purging nozzles 412 may be arranged with multiple smaller lenses of the fiber optics 408.

Figure 5:
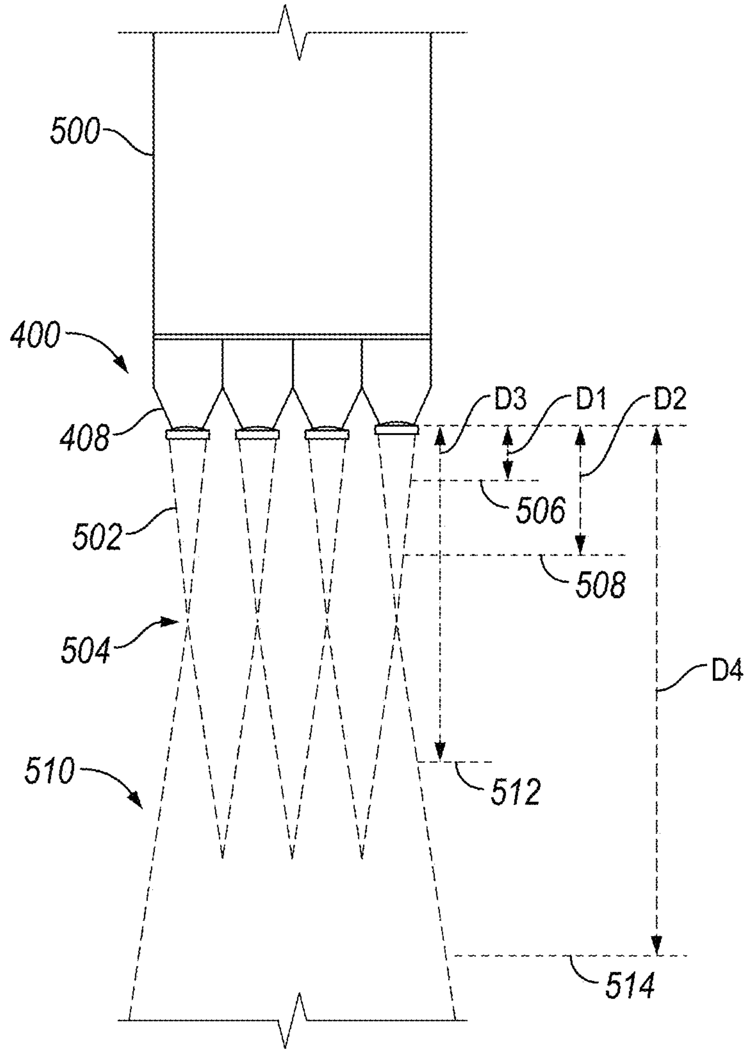
FIG. 5 is a schematic diagram of the operation of the laser head apparatus of FIGS. 4A and 4B in accordance with an embodiment of the disclosure.

FIG. 5 depicts operation of the laser head apparatus 400 and the manipulation of a laser beam 500 in accordance with an embodiment of the disclosure. As shown in FIG. 5, the laser beam 500 may enter the laser head apparatus 400 and pass through the fiber optics 408. The laser head apparatus 400 splits the laser beam 500 into multiple parallel converging laser beams 502 that converge to a focal plane 504 (that is, each of the parallel converging laser beams 502 converge to a respective focal point in the focal plane 504). The diameters of the parallel converging laser beams 502 change according to the distance from the laser head apparatus 500. For example, at a plane 506 located at a distance D1 from the laser head apparatus 400, the beams 502 have a greater diameter than at a plane 508 located at a greater distance D2. Additionally, as discussed in the disclosure, the beams at plane 508 have a greater intensity than the beams at plane 506.

Beyond the focal plane 504, the parallel converging laser beams 502 diverge to form parallel diverging laser beams 510. For example, at a plane 512 located at a distance D3 from the laser head apparatus 400, the parallel diverging laser beams 510 have a smaller diameter than at a plane 514 located at a greater distance D4. Additionally, as discussed in the disclosure, the beams at plane 514 have a lesser intensity than the beams at plane 512. As shown in FIG. 5, at a sufficient distance from the laser head apparatus 400 (for example, at plane 514), the parallel diverging laser beams 510 overlap to form a single larger laser beam.

Figure 6A:
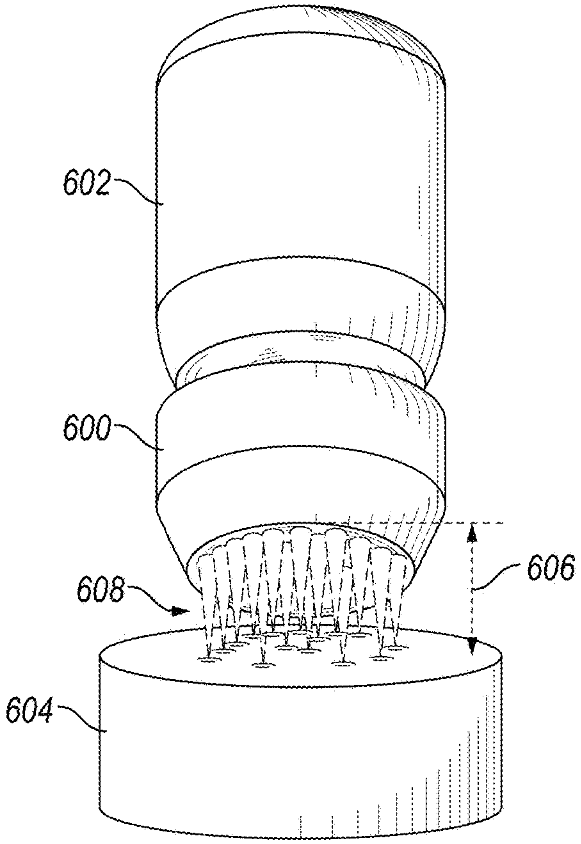
FIGS. 6A and 6B are schematic diagrams of the operation of a laser head apparatus coupled to a tool body to remove material in accordance with an embodiment of the disclosure.
Figure 6B:
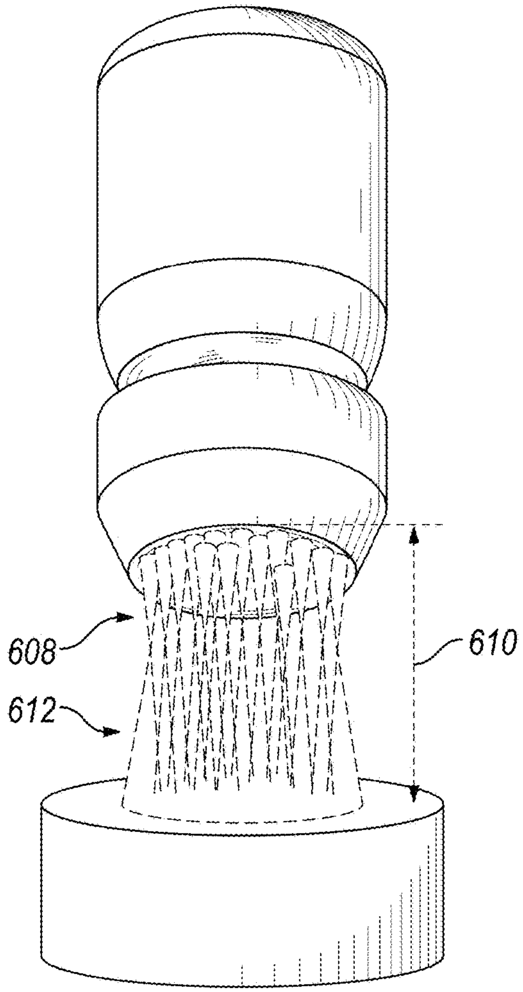

FIGS. 6A and 6B depicts operation of a laser head apparatus 600 coupled to a tool body 602 that produces parallel converging laser beams and diverging laser beams in accordance with an embodiment of the disclosure. As shown in these figures, the laser head apparatus may first be used to produce multiple smaller holes at a target location (for example, a surface) of a material 604 using parallel converging laser beams prepared from a laser beam received by the laser head apparatus. Next, the laser head apparatus 600 and tool body 602 may be moved out of focus with respect to target location of the material 604 to enable the formation of parallel diverging laser beams. The parallel diverging laser beams may overlap to form a larger beam to remove additional portions of the material 604 and continue the process of removing the material 604.

As shown in FIG. 6A, the laser head apparatus 600 may be moved toward a target location (for example, the surface of material 604) at a distance 606 from the material, such that the distance 606 is less than the distance to the focal plane of the laser optics of the laser head apparatus 600. A laser beam may be activated and received by the laser head apparatus 600 to produce parallel converging laser beams 608. A purging fluid flow may also be activated to flow through the purging nozzles of the laser head apparatus 600. The parallel converging laser beams may impact the material 604 to create holes in the material 604 to thereby remove a portion of the material 604.

After removal of a portion of the material 604 according to the technique illustrated in FIG. 6A, the laser head apparatus 600 may be moved away from the target location (for example, the surface of the material 604) to a distance 610 from the target location, as shown in FIG. 6B. The distance 610 is greater than the distance to the focal plane of the laser optics of the laser head apparatus 600. As this position of the laser head apparatus 600, a laser beam may be activated and may pass through the laser optics of the laser head apparatus 600 to produce parallel converging laser beams 608 that diverge to form parallel diverging laser beams 612.

As shown in FIG. 6B, the parallel diverging laser beams 612 may overlap to form a larger laser beam that impacts the target location of the material 604 and removes an additional portion of the material 604 (for example, by expanding the holes created by the parallel converging laser beams). In some embodiments, the power of the laser beam may be increased during the operation shown in FIG. 6B when the parallel diverging laser beams are used to remove a portion of the material. A flow of purging fluid may also be activated to flow through the purging nozzles of the laser head apparatus 600 and remove material debris created by the impact of the parallel diverging laser beams 612.

Figure 7:
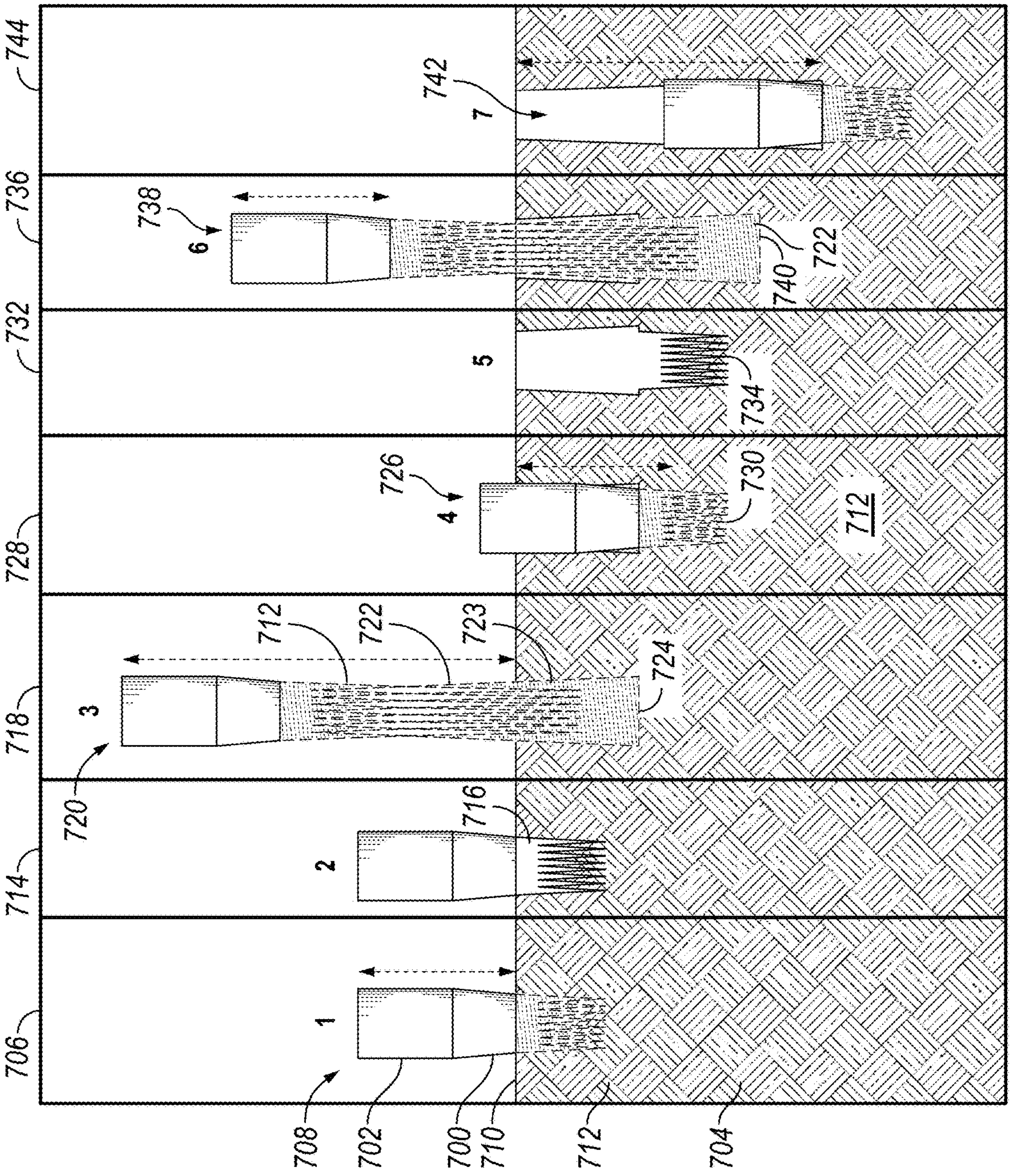
FIG. 7 is a schematic diagram of a sequence of operations of a laser head apparatus coupled to a tool body to remove material in accordance with an embodiment of the disclosure.

The operations described supra and illustrated in FIGS. 6A and 6B may be used to remove material formed in a pipe, hole, or other structure. FIG. 7 depicts a sequence of operations of a laser head apparatus 700 coupled to a tool body 702 to remove material 704 in accordance with an embodiment of the disclosure. As shown in panel 706, the laser head apparatus 700 may be moved to a first position 708, so that the distance from a surface 710 of the material is less than the distance to the focal plane of the laser beams produced by the laser optics of the laser head apparatus 700. In the position 708, the focal plane of laser beams produced by the laser optics is within the material 704.

In position 700, a laser beam may be activated and may pass through the laser optics of the laser head apparatus 700 to produce parallel converging laser beams 712. As shown in FIG. 7, the parallel converging laser beams 712 may impact the material 704 and remove the material 704 at and surrounding the points of impact. A purging fluid flow may also be activated to flow through the purging nozzles of the laser head apparatus 700. As shown in panel 714, holes 716 are formed in the material 704 by the multiple parallel converging laser beams 712.

Next, as shown in panel 718, the laser head apparatus 700 and tool body 702 may be moved to a second position 720, so that the distance of the laser head apparatus 700 from the surface 710 of the material is greater than the distance to the focal plane of the laser beams produced by the laser optics of the laser head apparatus 700. In this position, the focal plane of the focused laser beam is in front of the target location (that is, the surface 710 of the material 704).

In the second position 720, the laser beam may be activated and received by the laser head apparatus 700 to produce parallel converging laser beams 712 that diverge after the focal plane to form parallel diverging laser beams 722 that impact the target (that is, the surface 710 of the material 704). As shown in FIG. 7, these parallel diverging laser beams 722 may overlap to form a single larger laser beam 723.

In some embodiments, the power of the laser beam provided to the laser head apparatus 700 may be increased when the laser head apparatus 700 is in a position to generate the parallel diverging laser beams 722. A flow of purging fluid may also be activated to flow through the purging nozzles of the laser head apparatus 700 and remove material debris produced by the impact of parallel diverging laser beams 722. The parallel diverging laser beams 722 may remove additional material 704, resulting in the formation of a larger hole 724 (for example, a deeper hole) in the material 704. In some embodiments, the laser head apparatus 700 may be moved toward the material while the parallel diverging laser beams 722 are formed to further extend the hole 724.

After forming the hole 724, the laser beam 712 may be deactivated and the laser head apparatus 700 moved to a third position 726 as shown in panel 728 of FIG. 7. In the position 726, the laser head apparatus 700 may be positioned in the hole 724 so that the distance from the target (that is, an inner surface 730 of the material 704 at the bottom of the hole 724) is less than the distance to the focal plane of the laser beams produced by the laser optics of the laser head apparatus 700. In this position, the focal plane of the laser beams produced by the laser optics is within the material 704.

In position 726, the laser beam may be activated to produce parallel converging laser beams 712 to remove the material 704 at and surrounding the planes of impact, as described supra. A purging fluid flow may also be activated to flow through the purging nozzles of the laser head apparatus 700. As shown in panel 732, the parallel diverging laser beams 712 may remove additional portions of the material 704 by forming holes 734 that extend beyond the previously formed hole 724.

Next, as shown in panel 736, the laser beam may be deactivated and the laser head apparatus 700 and tool body 702 may be moved to a fourth position 738, so that the distance of the laser head apparatus 700 from the target location (that is, the bottom of the hole 724) of the material is greater than the distance to the focal plane of the laser beams produced by the laser optics of the laser head apparatus 700.

In the fourth position 738, laser beam may be activated and received by the laser head apparatus 700 to produce parallel converging laser beams 712 that diverge after the focal plane to form parallel diverging laser beams 722 that impact the target (that is, the bottom of the hole 724) to remove additional portions of the material 704 and form a larger hole 740 (for example, a deeper hole) in the material 704. As shown in FIG. 7, these parallel diverging laser beams 722 may again overlap to form a single larger laser beam 723. Additionally, the power of the laser beam 712 may be increased when the laser head apparatus 700 is in a position to generate the divergent larger laser beam 722. A flow of purging fluid may also be activated to pass through the purging nozzles of the laser head apparatus 700 and remove material debris from the hole 740. In some embodiments, the laser head apparatus 700 may be moved toward the material 704 while the parallel diverging laser beams are formed to further extend the hole 740.

After forming the hole 740, the laser beam 712 may be deactivated and the laser head apparatus 700 moved to a fifth position 742 shown in panel 744. The sequence of operations illustrated in FIG. 7 and described supra may be repeated until a desired amount of material is removed. In some embodiments, the laser head apparatus 700 and laser body 702 may also be moved laterally with respect to the material 704 to further remove material (for example, to expand the diameter of the holes formed in the material 704).

Figure 8:
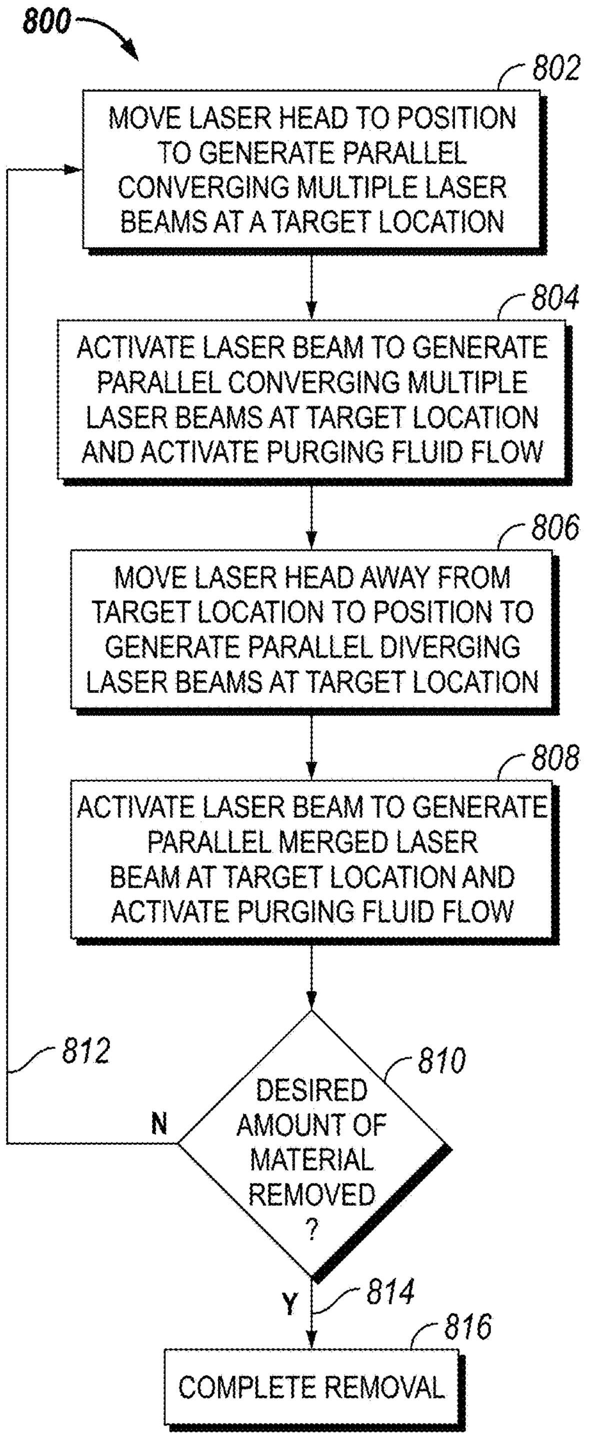
FIG. 8 is a block diagram of a process for operating a laser head apparatus in accordance with an embodiment of the disclosure.

FIG. 8 depicts a process 800 for removing material using convergent and divergent laser beams in accordance with an embodiment of the disclosure. Initially, a laser head apparatus of a laser tool may be moved to a position that enables the formation of parallel converging laser beams at a target location (block 802). For example, the laser head apparatus may be moved to a position that is less than the distance to a focal plane of the laser optics of the laser head apparatus.

Next, a laser beam received by the laser head apparatus may be activated to generate parallel converging laser beams via the laser optics of the laser head apparatus to impact a material (block 804). As discussed in the disclosure, the parallel converging laser beams may remove material by producing multiple holes in a material at the target location. A purging fluid flow may also be activated during the activation of the laser beam, after the activation of the laser beam, or both, to provide a purging fluid stream through the purging nozzles of the laser head apparatus and remove material debris generated from the impact of the parallel converging laser beams.

The laser head apparatus may then be moved away from the target to a position that provides for the formation of parallel diverging laser beams at the target location (block 806). For example, the laser head apparatus may be moved to a position that is greater than the distance to the focal plane of the laser optics of the laser head apparatus. The laser beam received by the laser head apparatus may be deactivated while the laser head apparatus is moved. The purging fluid flow may also be deactivated while the laser head apparatus is moved.

Next, the laser beam received by the laser head apparatus may be activated to form parallel diverging laser beams at the target location via the laser optics of the laser head apparatus (block 808). In some embodiments, the parallel diverging laser beams may merge before impacting the target location. As discussed in the disclosure, the parallel diverging laser beams may remove additional material, such as by expanding and extending previously formed holes in the material. A purging fluid flow may also be activated during the activation of the laser beam, after the activation of the laser beam, or both, to provide a purging fluid stream through the purging nozzles of the laser head apparatus and remove material debris generated from the impact of the parallel diverging laser beams. In some embodiments, the laser head apparatus may be moved toward the target location during formation of the parallel diverging laser beams to remove additional portions of the material. In some embodiments, the intensity of the laser beam received by the laser head apparatus may be increased during formation of the parallel diverging laser beams.

The process 800 may continue until the desired amount of material is removed (block 810). If the desired amount of material is not removed (line 812), the process 800 may continue by moving the laser head apparatus of a laser tool to a position that provides for generation multiple converging laser beams on a target (block 802). If the desired amount of material is removed (line 814), the removal of material may be completed (816).

Figure 9:
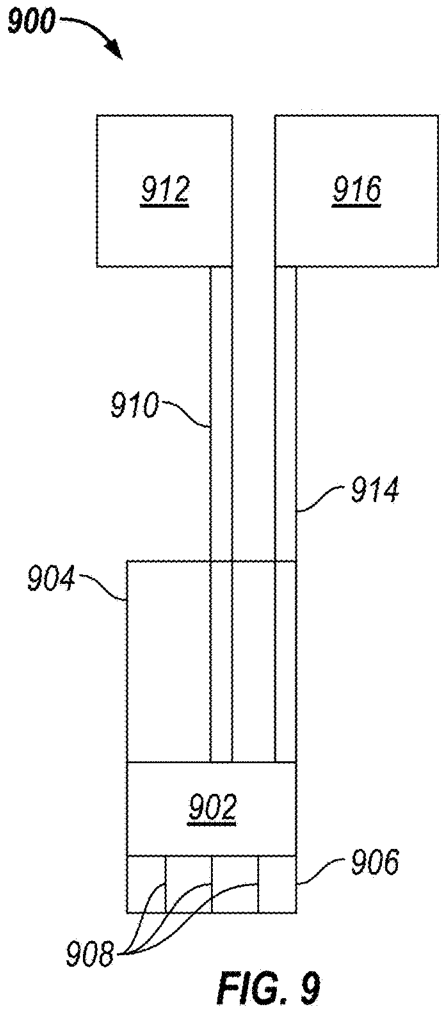
FIG. 9 is a block diagram of a tool with a laser head apparatus in accordance with an embodiment of the disclosure.

FIG. 9 is a block diagram of a tool 900 with a laser head apparatus 902 having a tool body 904, laser optics 906 and purging nozzles 908 in accordance with an embodiment of the disclosure. FIG. 9 also depicts a fiber optics cable 910, a laser unit 912, a purging fluid line 914, and a purging fluid source 916. In some embodiments, the laser head apparatus 902 and tool body 904 may be deployed downhole, such that some components of the system 900 may be surface units connected to the laser head apparatus 902 and tool body 904. In other embodiments, the tool 900 may be self-contained system that may be used at the surface to remove material from surface components or components located at the surface (such as after retrieval from a well).

The laser optics 906 may include one or more lenses for shaping or otherwise manipulating a laser beam received by the laser head apparatus 900. In some embodiments, the laser optics 906 includes a single lens having multiple optical elements to shape or otherwise manipulate a laser beam received from the laser unit 912. In such embodiments, each optical element may be a focusing element that produces a converging laser beam from a laser beam received by the laser head apparatus. In other embodiments, the laser optics 906 may include multiple smaller lenses (for example, a lens for each converging laser beam produced by the laser head apparatus 902). The one or more lenses, and optical elements, may be formed of any material suitable for use in lenses that shape or otherwise manipulate a laser beam. Examples of materials suitable for use in the one or more lenses of laser optics 906 of the laser head apparatus 902 may include glass, plastic, quartz, and crystal. In some embodiments, the laser optics 906 may include additional components, such as a collimator, to produce a collimated laser beam. As will be appreciated, a collimator may be combined with the one or more lenses described in the disclosure. The collimator may be formed of any material suitable for collimating a laser beam. By way of example, such materials may include glass, plastic, quartz, and crystal.

The purging nozzles 908 may direct a flow of purging fluid from the purging fluid source 916. In some embodiments, the purging nozzles 908 may be disposed in a single lens of the fiber optics 906. In other embodiments, the purging nozzles 908 may be arranged with multiple smaller lenses of the fiber optics 906.

The laser unit 912 can be in optical communication with laser head apparatus 902 via fiber optic cable 910. The laser unit 912 may be configured to excite energy to a level greater than the sublimation point of a material to form a laser beam (not shown). In some embodiments, laser unit 912 may be tuned to excite energy to different excitation levels as can be required for different formations. The laser unit 912 may be any type of laser unit capable of generating a laser beam and introducing said laser beam into a fiber optic cable. Examples of laser beams generated by the laser unit 912 include lasers of ytterbium, erbium, neodymium, dysprosium, praseodymium, and thulium ions.

The fiber optic cable 910 may be any cable containing an optical fiber capable of transmitting a laser beam from the laser unit 912 to the laser head apparatus 902. For example, the fiber optic cable 910 may include one or more optical fibers. In an alternate embodiment, one or more fiber optic cables can provide electrical communication between the laser unit 912 and the laser head apparatus 902. In at least one embodiment, the fiber optic cable 910 provides a path for light from the laser unit 912 to the laser head apparatus 902. In some embodiments, the fiber optic cable 910 can conduct a raw laser beam from the laser unit 912 to the laser head apparatus 902. A "raw laser beam" as used herein refers to a laser beam that has not been passed through lenses or otherwise focused.

The purging fluid source 916 may provide a purging fluid to the laser head apparatus 502. The purging fluid source 916 is in fluid communication with the laser head apparatus 902 via the fluid line 914, such that the purging fluid is delivered to the laser head apparatus 902 from purge fluid source 916. The purging fluid line 914 can be any type of tube capable of supplying a fluid to the laser head apparatus 902. The purging fluid may be nitrogen gas, liquid nitrogen, helium, air, carbon dioxide, or water. The purging fluid may be selected based on the material to be removed and the thermal properties of the material. In some embodiments, multiple fluid lines 914 may be in fluid communication with purging fluid source 916 and the laser head apparatus 902.

In some embodiments, having a downhole application, fiber optic cable 910 and fluid line 914 may be enclosed in a protective shaft (not shown). Such a protective shaft may be any material of construction suitable for use in a downhole environment without experiencing mechanical or chemical failure. As used here, "downhole environment" refers to the high operating pressure, high operating temperature, and fluid conditions that can be found in a wellbore extending into a formation. In some embodiments, for example, the tool body 904 may provide or include such a protective shaft.

In some embodiments, the laser head apparatus 902 and tool body 904 may be moved manually (for example, inserted into and out of a pipe, hole, or other structure). In other embodiments, the laser head apparatus 902 and tool body 904 may be operatively coupled to a motor that provides mechanical energy to move the laser head apparatus 902 and tool body 904 into and out of a pipe, hole, or other structure.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A laser head apparatus, the apparatus comprising:

a cylindrical housing; and laser optics disposed in the cylindrical housing and configured to transform a laser beam into a plurality of parallel converging laser beams to impact a surface of a material, each of the plurality of parallel converging laser beams converging onto a focal plane, wherein the diameter of each of each of the plurality of parallel converging laser beams is less than the diameter of the laser beam, wherein the laser optics comprise a first plurality of optical elements circumferentially disposed around the cylindrical housing and a second plurality of optical elements distributed within the interior of the circumference of the cylindrical housing, each of the optical elements configured to transform a portion of the laser into a respective one of the plurality of parallel converging laser beams; and a plurality of purging fluid nozzles disposed in the cylindrical housing and distributed amongst the first plurality of optical elements and the second plurality of optical elements, wherein the laser head apparatus is moveable away from the material such that the laser optics disposed in the cylindrical housing are configured to transform the laser beam into a plurality of parallel diverging laser beams to impact the surface of the material.

2. The apparatus of claim 1, wherein the plurality of purging fluid nozzles are arranged to provide a purging fluid stream, wherein the purging fluid comprises nitrogen.

3. A method for removing material using a laser, comprising:

introducing a plurality of parallel converging laser beams to the material at a target location, wherein the target location is a surface, the plurality of parallel converging laser beams produced by laser optics disposed in a cylindrical housing of a laser head apparatus and configured to transform a laser beam into the plurality of parallel converging laser beams, each of the plurality of parallel converging laser beams converging onto a focal plane such that the target location is located between the focal plane and the laser head apparatus, wherein the laser optics comprise a first plurality of optical elements circumferentially disposed around the cylindrical housing and a second plurality of optical elements distributed within the interior of the circumference of the cylindrical housing, each of the optical elements configured to transform a portion of the laser into a respective one of the plurality of parallel converging laser beams;

introducing a purging fluid via a plurality of purging nozzles disposed in the cylindrical housing and distributed amongst the first plurality of optical elements and the second plurality of optical elements while introducing the plurality of parallel converging laser beam;

removing a first portion of the material using the plurality of parallel converging laser beams;

introducing, after introducing a plurality of parallel converging laser beams to the material at the target location, a plurality of parallel diverging laser beams to the material at the target location, wherein the plurality of parallel diverging laser beams are formed from the plurality of parallel converging laser beams, such that the target location is located beyond the focal plane and the plurality of parallel diverging laser beams overlap before introduction to the target location;

introducing a purging fluid via the plurality of purging nozzles while introducing the plurality of parallel diverging laser beams; and removing a second portion of the material using the plurality of parallel diverging laser beams.

4. The method of claim 3, wherein introducing the plurality of parallel diverging laser beams to the material at the first target location comprises increasing a power of the laser beam.

5. The method of claim 3, wherein removing the second portion of the material comprises moving the laser head apparatus away from material during the removal.

6. The method of claim 3, wherein the plurality of parallel converging laser beams is a first plurality of parallel converging laser beams, the target location is a first target location, and the focal plane is a first focal plane, the method comprising:

introducing a second plurality of parallel converging laser beams to the material at a second target location, wherein the second plurality of parallel converging laser beams are produced by the laser head apparatus disposed in the cylindrical housing, each of the second plurality of parallel converging laser beams converging onto a second focal plane such that the second target location is located between the second focal plane and the laser head;

removing a third portion of the material using the second plurality of parallel converging laser beams.

7. The method of claim 6, wherein the plurality of parallel diverging laser beams is a first plurality of parallel diverging laser beams, the method comprising:

introducing a second plurality of parallel diverging laser beams to the material at the second target location, wherein the second plurality of parallel diverging laser beams are formed from the first plurality of parallel converging laser beams, such that the second target location is located beyond the second focal plane and the second plurality of parallel diverging laser beams overlap before introduction to the second target location; and removing a fourth portion of the material using the second plurality of parallel diverging laser beams.

8. A system, comprising:

a laser unit, the laser unit configured to generate a laser beam;

a fiber optic cable, the fiber optic cable optically connected to laser optics of a laser head apparatus, the fiber optic cable configured to transmit the laser beam to the laser optics to produce a plurality of parallel converging laser beams;

a purging fluid line, the purging fluid line connected to a purging fluid source and configured to supply a purging fluid to a plurality of purging fluid nozzles of the laser head apparatus; and the laser head apparatus, comprising:

a cylindrical housing;

the laser optics disposed in the cylindrical housing and configured to transform the laser beam into the plurality of parallel converging laser beams to impact a surface of a material, each of the plurality of parallel converging laser beams converging onto a focal plane, wherein the laser optics comprise a first plurality of optical elements circumferentially disposed around the cylindrical housing and a second plurality of optical elements distributed within the interior of the circumference of the cylindrical housing, each of the optical elements configured to transform a portion of the laser into a respective one of the plurality of parallel converging laser beams; and the plurality of purging fluid nozzles disposed in the cylindrical housing and distributed amongst the first plurality of optical elements and the second plurality of optical elements, the plurality of purging fluid nozzles configured to distribute a purging fluid, wherein the laser head apparatus is moveable away from the material such that the laser optics disposed in the cylindrical housing are configured to transform the laser beam into a plurality of parallel diverging laser beams to impact the surface of the material.

9. The system of claim 8, wherein the purging fluid comprises nitrogen.

* * * * *